United States Patent [19]
Peterson

[11] 3,866,624
[45] Feb. 18, 1975

[54] AUTOMOBILE SERVICE LANE WITH SERVICING PIT
[76] Inventor: Eric J. Peterson, 522 S.W. 11th Ct., Fort Lauderdale, Fla. 33315
[22] Filed: July 17, 1973
[21] Appl. No.: 379,961

[52] U.S. Cl. .............................. 137/234.6, 137/236
[51] Int. Cl. ............................................ B60s 5/02
[58] Field of Search .......... 137/234.6, 236; 184/1.5, 184/7 C

[56] References Cited
UNITED STATES PATENTS
2,872,709  2/1959  Brem ............................... 137/234.6
3,079,871  3/1963  Brodie ........................ 137/234.6 X Primary Examiner—Alan Cohan
Attorney, Agent, or Firm—Larson, Taylor & Hinds

[57] ABSTRACT

A gasoline service lane for a gas station including a recessed service pit positioned therein so that an attendant can perform work beneath an automobile such as an oil change or a lubrication while the automobile is being filled with gasoline. The pit has a retractable shield to cover the same when not in use.

8 Claims, 2 Drawing Figures

AUTOMOBILE SERVICE LANE WITH SERVICING PIT

BACKGROUND OF THE INVENTION

This invention relates to a service area for a gasoline station and in particular it relates to a gasoline service lane having means therein to effect servicing such as changing the oil or lubricating the automobile while the car is being filled with gasoline.

Proper care of an automobile requires that certain basic maintenance, in particular lubrication and oil changing, be performed regularly. Such regular maintenance is important not only to assure proper operation of the automobile, but also to prevent needless pollution of the air since, as is well known, an engine which is operating at optimum efficiency will burn the gasoline more efficiently, leaving less unburned components to reach and pollute the atmosphere.

Notwithstanding the importance of such regular maintenance, it is performed far less often than it should be. The reason for this is not because an oil change and a lubrication are expensive or complicated; and indeed, this maintenance is quite simple and relatively inexpensive. Rather, it is believed that such regular maintenance is performed less often than it should be because of the considerable inconvenience to which the automobile owner is subjected in attempting to get an oil change and a lubrication. While the time required for this regular maintenance is quite short, in fact if one drives into an automobile station to request such service, it might take anywhere from one-half hour to an hour because of the time required both to wait for and use the hydraulic lift. Indeed, in many cases an appointment is required for this relatively simple maintenance. Such simple inconveniences tend to postpone regular oil changes and lubrication for a period of time much greater than that recommended by the automobile manufacturer. Indeed, as an automobile gets older and requires more oil changes and/or lubrications to reduce engine wear, just the opposite takes place. Owing to the inconvenience, the owner of an older automobile will be much more likely to postpone such maintenance.

Thus, there exists a need for an arrangement wherein the inconveniences associated with lubricating and changing the oil of an automobile are eliminated.

SUMMARY OF THE INVENTION

Thus, it is a purpose of this invention to provide a new and improved service area for a gasoline station wherein certain regular maintenance such as changing the oil or lubricating an automobile is vastly simplified.

This purpose is achieved in accordance with the present invention by constructing a service area for a gasoline station wherein the automobile may be conveniently lubricated and have its oil changed concurrently as it is being filled with gasoline. In a preferred arrangement of the invention, a pit deep enough for a man to walk into and service the bottom of an automobile is placed adjacent the gasoline pumps in a gas station. In this manner, as the automobile is being filled with gasoline, it can concurrently be lubricated and have its oil changed. It has been found that this additional maintenance can be performed in approximately five minutes more than is required for the gasoline fill-up itself. The pit would have a retractable cover which would cover the same when not in use so that automobiles could drive through this area in the regular manner.

Thus, it is an object of this invention to simplify the task of lubricating and changing the oil of an automobile by removing the conventional inconveniences associated therewith.

It is another object of this invention to provide a gasoline service area having adjacent thereto a lubrication and oil change pit whereby the automobile can be concurrently filled with gasoline, be lubricated and have its oil changed.

Other objects and the advantages of the present invention will become apparent from the detailed description to follow, together with the accompanying drawings.

BRIEF DESCRIPTION OF THE DRAWINGS:

There follows a detailed description of the preferred embodiment of the invention to be read together with the accompanying drawing.

Figure 1:
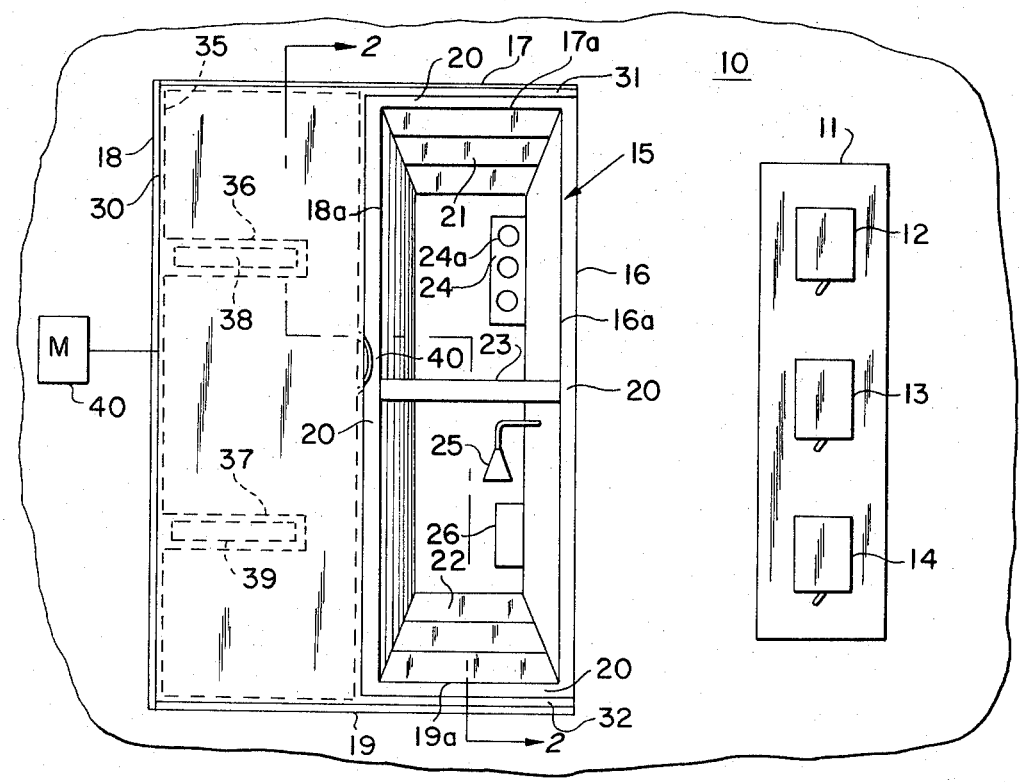
FIG. 1 is a plan view of a gasoline service lane of a gas station showing the features of the present invention.

DETAILED DESCRIPTION OF THE PREFERRED EMBODIMENT:

Referring now to the drawings, like elements are represented by like numerals throughout the two views.

A gasoline service lane 10 of a gasoline station includes a conventional gasoline pump island 11 with gasoline pumps 12, 13 and 14, each having a conventional hose for delivering gasoline from the pumps into the gas tank of an automobile positioned adjacent thereto. Adjacent the gasoline pumps at a position which would normally be located between the wheels of an automobile properly positioned to receive gasoline is a service pit 15. The overall construction associated with the pit is bordered by edges 16, 17, 18, and 19. Spaced inwardly therefrom are further edges 16a, 17a, 18a and 19a, respectively. At edges 16–19, there is a very slight drop to a platform level 20 which extends inwardly to the edges 16a–19a, and the area bounded by these edges 16a–19a constitutes the service pit itself. As will be explained below, the platform level 20 is concerned essentially with providing a retractable shield for the pit 15.

In a preferred arrangement, the pit will be 3 feet wide, 25 feet long, and 5½ feet deep. The pit would be parallel to the island 11 and approximately 4½ feet away from the island. Steps 21 and 22 are included at each end to facilitate entering and leaving the pit. Located within the pit would be known means for effecting oil changes and lubrication including a storage area 24 such as shelves or the like for storing motor oil cans 24a or the like, an adjustable oil drain funnel 25 for draining off the oil, and a lubrication fixture 26.

It is necessary to provide a shield which can cover the pit 15 when the latter is not in use, this shield being strong enough to support the weight of an automobile. Moreover, this shield should preferably be encased or in some manner sub-surfaced when retracted so that the shield can be operated to close the pit or retracted while wheels of an automobile are located above the retracted position of the shield.

Figure 2:
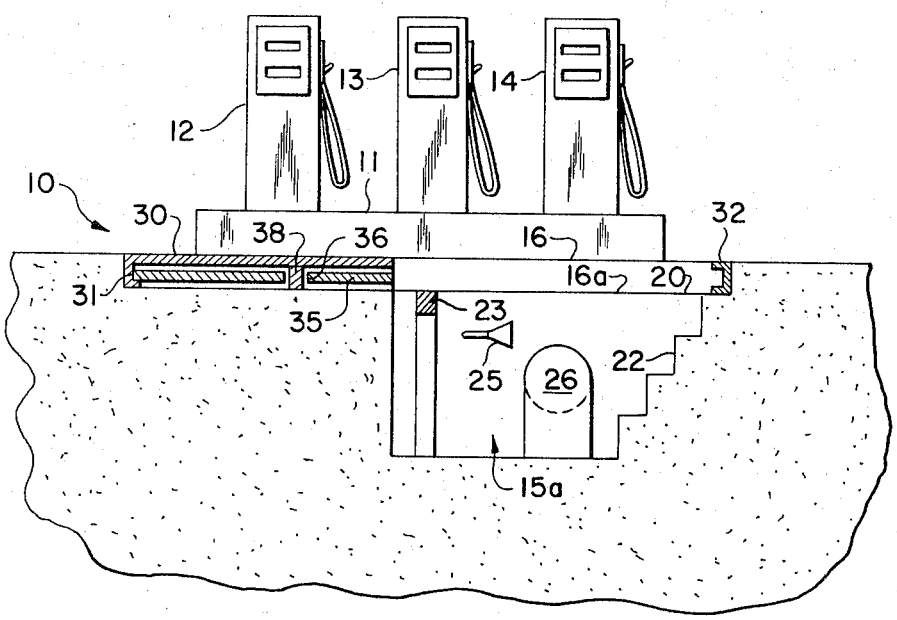
FIG. 2 is a partial cross-section and partial elevational view taken along line 2—2 of FIG. 1.

In the illustrated embodiment, there is provided a steel plate 30 supported by suitable means such as support posts 38 and 39, the former of which is visible in cross-section in FIG. 2, up to a level approximately flush with the ground level of service lane 10. Guide rails 31 and 32 are located at each end of the plate 30 extending adjacent and parallel to edge 17 and edge 19, respectively. A retractable shield 35 is shown in dotted lines in FIG. 1 in its retracted position beneath the steel plate 30. It includes a pair of slots 36 and 37 to surround the fixed posts 38 and 39 when the shield is in the retracted position. The slots would be small enough in width so that when the shield overlies the pit, tires of automobiles crossing these slots will not be caught therein. In the retracted position, the shield 35 rests essentially on the portion of platform level 20 between edges 18 and 18a. In the operative or closed position the shield is moved to the right out from beneath the plate 30, at which time its outer perimeter would rest on platform level 20 on all sides of the pit 15. To assure proper support, a cross-support 23 is provided across the center of the pit 15 at a level approximately flush with the platform level 20.

The shield 35 would preferably be moved by a power means such as a sub-surface motor 40 which could of course be any type of motor such as an electric motor, a hydraulic motor, etc. This power means could be operatively associated with the shield 35 in any suitable manner. For example, it could operate a piston and cylinder unit which pushes and pulls the shield. Alternatively, a rack and pinion arrangement could be provided wherein the edges of shield 35 located within runners 31 and 32 could be formed with teeth, and pinions could engage the same to move the shield outwardly and inwardly. In addition thereto, or possibly in lieu thereof, the platform level 20 could be provided with friction reducing means such as rollers or the like to ease movement of the shield 35. For example, such rollers would preferably be provided in the area of platform 20 between edges 18 and 18a, but such rollers would also be helpful in the area between edges 17 and 17a, between 19 and 19a, along the support 23, and possibly also built into the guide rails 31 and 32, If enough such friction reducing means were provided, it would not be altogether unfeasible to move the shield 35 manually, for example by gripping and pulling a handle 40 located on the edge of shield 35 closest to the pit 15. This handle could be formed of a flexible material so that it would not inhibit movement of the shield 35 against edge 16 to assure that the corresponding edge of shield 35 received proper support on the platform level 20 between edges 16 and 16a in the closed position.

It will be apparent that numerous modifications and variations are possible. For example, a layer of concrete can be provided in addition to or in lieu of the covering steel plate 30.

Although the invention has been described in considerable detail with respect to preferred embodiments thereof, it will be apparent that the invention is capable of numerous modifications and variations apparent to those skilled in the art without departing from the spirit and scope of the invention.

I claim:

1. An automobile service area comprising:
    a service lane arranged for an automobile to drive thereon for servicing,
    a gasoline pump adjacent the service lane and a hose means for delivering gasoline from the pump into an automobile located in the service lane,
    an automobile service pit located in the service lane at a distance from the gasoline pump but beneath an automobile parked in the service lane for receiving gasoline from the gasoline pump via the hose means and between the wheels of that automobile,
    said pit being deep enough for a person to stand therein while servicing the bottom of the automobile,
    and a retractable shield mounted in the service lane to selectively cover or uncover the service pit, and means mounting the shield such that it can support the weight of an automobile when in its closed position over the pit.

2. An automobile service lane according to claim 1, said pit being elongated in the direction of travel of the automobile and said shield being movable in a direction transverse to said direction of automobile travel.

3. An automobile service area according to claim 2, said retractable shield being located beneath the surface of the service lane in the retracted position, such shield being openable and closable while an automobile is parked over the pit with its wheels straddling the pit and at least one wheel located directly above the retracted shield.

4. An automobile service area according to claim 3, including a power means for moving the shield in its opening and closing directions.

5. An automobile service area according to claim 2, the edge of the pit closest to the gasoline pump being approximately four to five feet from the gasoline pump.

6. An automobile service area according to claim 5, said pit being approximately 3 feet wide and 5 feet deep.

7. An automobile service area according to claim 6, said pit being approximately 25 feet long, and including at least one set of stairs at an end of the pit.

8. An automobile service area according to claim 1, said service lane being open at both ends in the direction of travel of the automobile such that an automobile can drive onto the service lane from one direction and drive off of the service lane in the opposite direction.

* * * * *